United States Patent
Ishiyama

(10) Patent No.: US 10,223,953 B2
(45) Date of Patent: Mar. 5, 2019

(54) LIQUID CRYSTAL DISPLAY DEVICE WITH DATA VOLTAGE CORRECTION

(71) Applicant: Panasonic Liquid Crystal Display Co., Ltd., Himeji-shi, Hyogo (JP)

(72) Inventor: Yoshinori Ishiyama, Hyogo (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 0 days.

(21) Appl. No.: 15/467,534

(22) Filed: Mar. 23, 2017

(65) Prior Publication Data

US 2017/0278446 A1 Sep. 28, 2017

(30) Foreign Application Priority Data

Mar. 24, 2016 (JP) ................. 2016-060751

(51) Int. Cl.
G09G 3/36 (2006.01)
G09G 3/20 (2006.01)
G02F 1/1343 (2006.01)
G02F 1/1362 (2006.01)
G02F 1/1368 (2006.01)

(52) U.S. Cl.
CPC ..... *G09G 3/2011* (2013.01); *G02F 1/134309* (2013.01); *G02F 1/136286* (2013.01); *G09G 3/2003* (2013.01); *G09G 3/3607* (2013.01); *G09G 3/3614* (2013.01); *G09G 3/3688* (2013.01); *G02F 1/1368* (2013.01); *G02F 2201/121* (2013.01); *G02F 2201/123* (2013.01); *G09G 2300/0426* (2013.01); *G09G 2310/08* (2013.01); *G09G 2320/0233* (2013.01); *G09G 2320/0242* (2013.01)

(58) Field of Classification Search
CPC .................. G09G 3/3611; G09G 2310/08
USPC ...................................... 345/87–88
See application file for complete search history.

(56) References Cited

U.S. PATENT DOCUMENTS

| | | | |
|---|---|---|---|
| 8,674,915 B2* | 3/2014 | Nakamura | G02F 1/133707 345/87 |
| 2002/0097207 A1* | 7/2002 | Pfeiffer | G09G 3/2011 345/87 |
| 2008/0180622 A1 | 7/2008 | Horiguchi et al. | |
| 2009/0102766 A1* | 4/2009 | Oke | G09G 3/3648 345/88 |

FOREIGN PATENT DOCUMENTS

JP 2008-180928 8/2008

* cited by examiner

*Primary Examiner* — Roy P Rabindranath
(74) *Attorney, Agent, or Firm* — Hamre, Schumann, Mueller & Larson, P.C.

(57) ABSTRACT

A liquid crystal display device includes a first substrate including a pixel electrode and a common electrode, a second substrate disposed opposite to the first substrate, and a liquid crystal layer that is disposed between the first substrate and the second substrate. The liquid crystal layer includes a liquid crystal molecule having a positive dielectric anisotropy. In a first pixel and a second pixel, which are adjacent to each other, when a first data voltage applied to the first pixel in an input video signal is higher than a second data voltage applied to the second pixel in the input video signal, a first correction data voltage in which the first data voltage is corrected lower is applied to the first pixel.

4 Claims, 13 Drawing Sheets

FIG.13

| | | INPUT GRAY SCALE OF CURRENT PIXEL DATA | | | | | | | |
|---|---|---|---|---|---|---|---|---|---|
| | | 0 | 32 | 64 | 128 | 160 | 192 | 224 | 255 |
| INPUT GRAY SCALE OF PRECEDING PIXEL DATA | 0 | 0 | 32 | 64 | 128 | Da1 | Db2 | Dc3 | Dd4 |
| | 32 | 0 | 32 | 64 | 128 | 160 | Db1 | Dc2 | Dd3 |
| | 64 | 0 | 32 | 64 | 128 | 160 | 192 | Dc1 | Dd2 |
| | 128 | 0 | 32 | 64 | 128 | 160 | 192 | 224 | Dd1 |
| | 160 | 0 | 32 | 64 | 128 | 160 | 192 | 224 | 255 |
| | 192 | 0 | 32 | 64 | 128 | 160 | 192 | 224 | 255 |
| | 224 | 0 | 32 | 64 | 128 | 160 | 192 | 224 | 255 |
| | 255 | 0 | 32 | 64 | 128 | 160 | 192 | 255 | 255 |

LIQUID CRYSTAL DISPLAY DEVICE WITH DATA VOLTAGE CORRECTION

CROSS-REFERENCE TO RELATED APPLICATION

The present application claims priority from Japanese application JP 2016-060751 filed on Mar. 24, 2016, the content of which is hereby incorporated by reference into this application.

TECHNICAL FIELD

This disclosure relates to a liquid crystal display device.

BACKGROUND

In various liquid crystal display devices, a lateral electric field scheme liquid crystal display device (for example, see Patent Literature 1: JP 2008-180928 A) has an advantage of an excellent wide view angle characteristic. For example, the lateral electric field scheme liquid crystal display device includes a pixel electrode and common electrode on one of a pair of substrates, which are disposed opposite to each other with a liquid crystal layer interposed therebetween, an electric field (lateral electric field) parallel to a substrate surface is generated between the pixel electrode and the common electrode, and the lateral electric field is applied to liquid crystal to drive the liquid crystal, whereby a quantity of light transmitted through the liquid crystal layer is controlled to display an image. For example, the lateral electric field scheme includes an IPS (In Plane Switching) scheme and an FFS (Fringe Field Switching) scheme.

The inventors of the present disclosure have found that a variation in display luminance occurs due to an influence of a difference in amplitude between data voltages applied to pixels adjacent to each other in the case where positive-type liquid crystal is used in the lateral electric field scheme liquid crystal display device. Particularly, in an area subjected to a longitudinal electric field, a tilt angle increases to easily lower a transmittance because the positive-type liquid crystal has a characteristic that a major axis is aligned with an electric field direction. For example, for the large difference in amplitude between the data voltages applied to the pixels adjacent to each other, one of the pixels is set to a data voltage (+Vn) having a positive polarity corresponding to a white color while the other pixel is set to a data voltage (−Vn) having a negative polarity corresponding to the white color. In such cases, the tilt angle of the liquid crystal increases due to the electric field corresponding to the difference in amplitude, particularly in a boundary between the two pixels. Therefore, the transmittances of the two pixels are lowered to lower the display luminance. Thus, in each pixel, the transmittance and the display luminance depend on levels and polarities of the data voltages applied to the pixels adjacent to each other.

SUMMARY

The present disclosure has been made in view of the above problems, and an object thereof is to reduce a variation in display luminance in a lateral electric field scheme liquid crystal display device.

In one general aspect, the instant application describes a liquid crystal display device includes a first substrate including a pixel electrode and a common electrode, a second substrate disposed opposite to the first substrate; and a liquid crystal layer that is disposed between the first substrate and the second substrate. The liquid crystal layer includes a liquid crystal molecule having a positive dielectric anisotropy. In a first pixel and a second pixel, which are adjacent to each other, when a first data voltage applied to the first pixel in an input video signal is higher than a second data voltage applied to the second pixel in the input video signal, a first correction data voltage in which the first data voltage is corrected lower is applied to the first pixel.

The above general aspect may include one or more of the following features. When a difference between the first data voltage and the second data voltage is higher than a predetermined value, the first data voltage may be corrected to the first correction data voltage.

When the first data voltage is higher than the second data voltage and a polarity of the first data voltage is different from a polarity of the second data voltage, the first data voltage may be corrected to the first correction data voltage.

When a first input gray scale corresponding to the first pixel in the input video signal is higher than a second input gray scale corresponding to the second pixel in the input video signal and a difference between the first input gray scale and the second input gray scale is higher than a predetermined gray scale, a data voltage corresponding to a first correction gray scale in which the first input gray scale is corrected lower may be applied to the first pixel.

The liquid crystal display device may further include a comparator that compares a first input gray scale corresponding to the first pixel in the input video signal with a second input gray scale corresponding to the second pixel in the input video signal; and a corrector that corrects the first input gray scale to a first correction gray scale lower than the first input gray scale when the first input gray scale is higher than the second input gray scale and a difference between the first input gray scale and the second input gray scale is higher than a predetermined gray scale.

The liquid crystal display device may further include a look-up table in which the first input gray scale, the second input gray scale, and the first correction gray scale are associated with one another; and a decision unit that refers to the look-up table to decide the first correction gray scale. The corrector may correct the first input gray scale to the first correction gray scale decided by using the decision unit.

In another general aspect, the instant application describes a liquid crystal display device includes a first substrate including a pixel electrode and a common electrode, a second substrate disposed opposite to the first substrate, and a liquid crystal layer that is disposed between the first substrate and the second substrate. The liquid crystal layer includes a liquid crystal molecule having a positive dielectric anisotropy. In a display pixel including one red pixel, one green pixel, and one blue pixel, when a signal having a maximum level gray scale is input to each of the red pixel, the green pixel, and the blue pixel to display a white image, a first data voltage having a first voltage level is supplied to a data line connected to the red pixel. When a signal having a maximum level gray scale is input to the red pixel and a signal having a minimum level gray scale is input to each of the green pixel and the blue pixel to display a red monochrome image, a second data voltage having a second voltage level is supplied to the data line connected to the red pixel, and the second voltage level is set lower than the first voltage level.

In the configuration of the liquid crystal display device of the present disclosure, the variation in display luminance can be reduced in the lateral electric field scheme liquid crystal display device.

BRIEF DESCRIPTION OF THE DRAWINGS

FIG. 13 is a view illustrating an example of look-up table according to an exemplary embodiment of the present disclosure.

DETAILED DESCRIPTION

Figure 1:
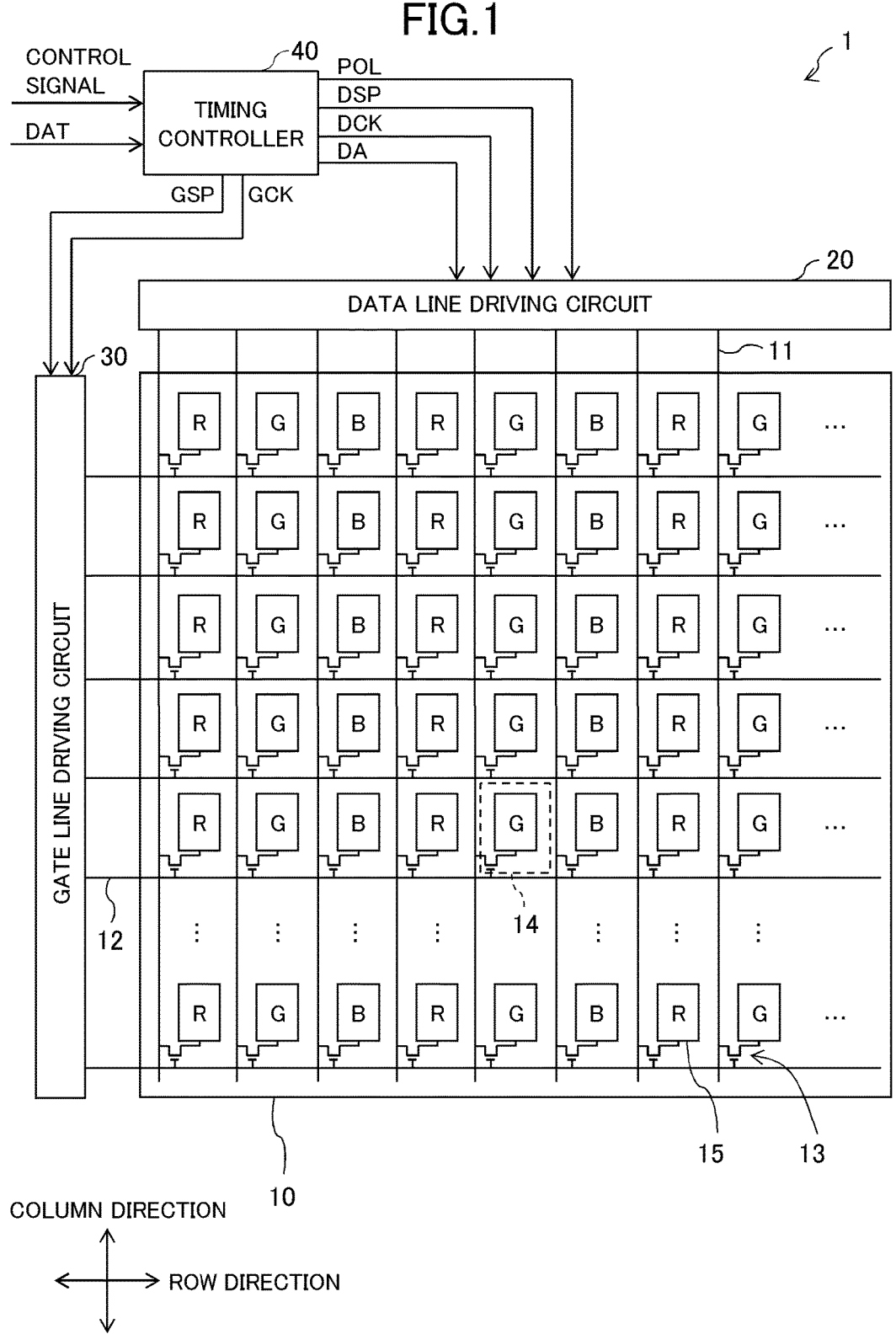
FIG. 1 is a plan view illustrating a schematic configuration of a liquid crystal display device according to an exemplary embodiment of the present disclosure.

FIG. 1 is a plan view illustrating a schematic configuration of a liquid crystal display device according to an exemplary embodiment of the present disclosure. Liquid crystal display device 1 includes display panel 10 that displays an image, a driving circuit (data line driving circuit 20 and gate line driving circuit 30) that drives display panel 10, timing controller 40 that controls the driving circuit, and a backlight (not illustrated) that irradiates display panel 10 with light from a rear surface side. The driving circuit may be provided in display panel 10.

Figure 2:
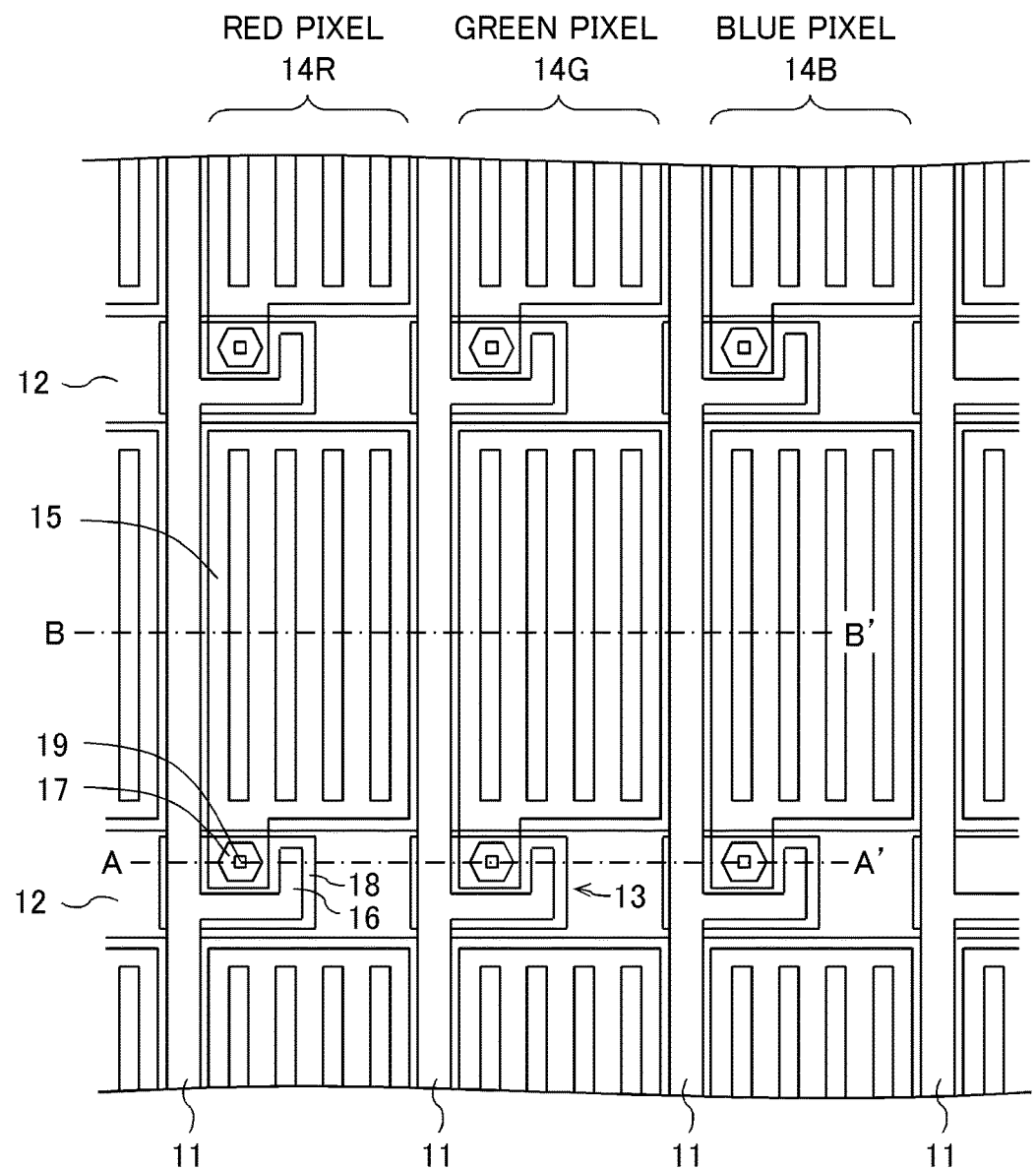
FIG. 2 is a plan view partially illustrating a configuration of display panel according to an exemplary embodiment of the present disclosure.
Figure 3:
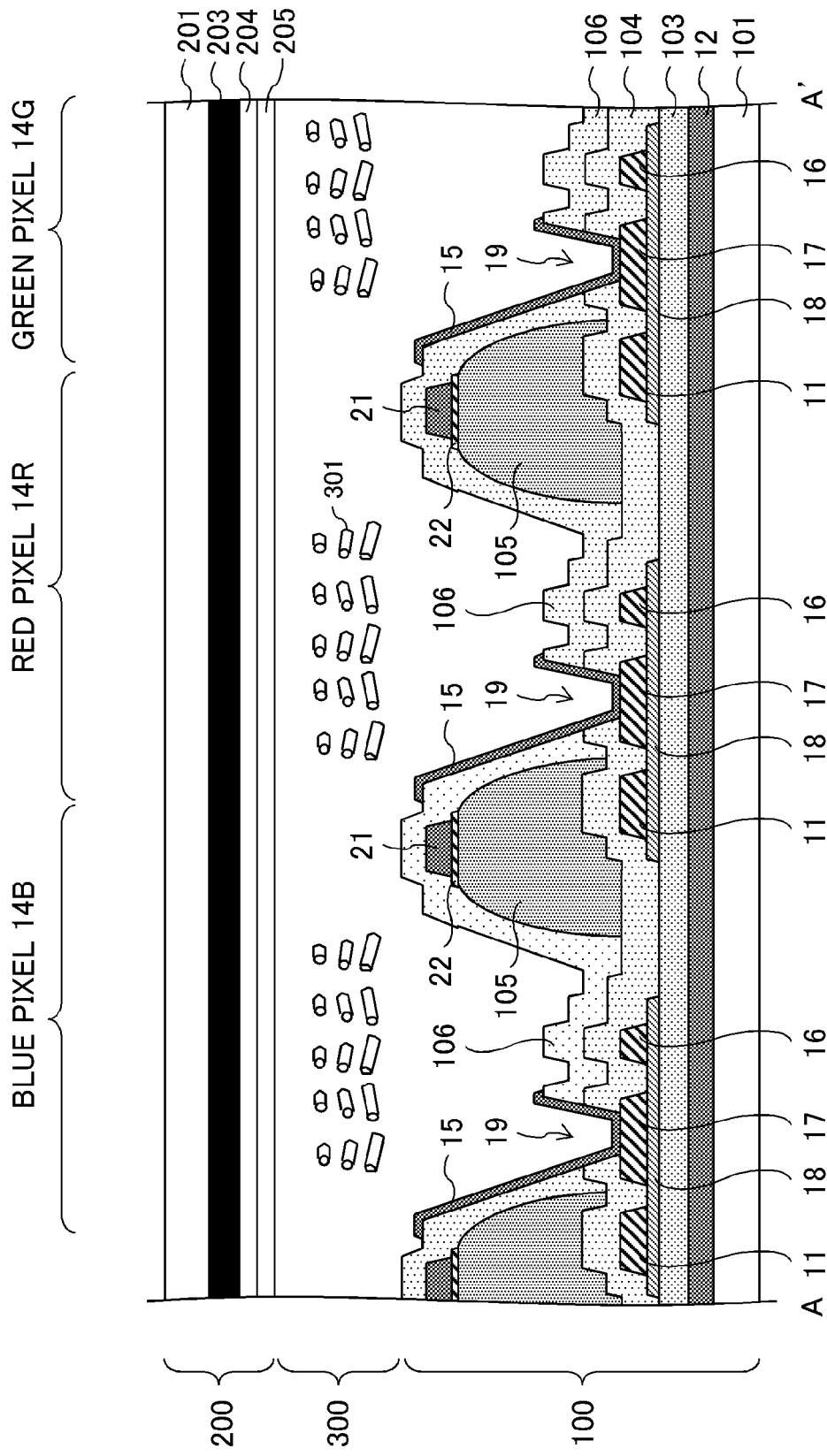
FIG. 3 is a sectional view taken along line A-A' in FIG. 2.
Figure 4:
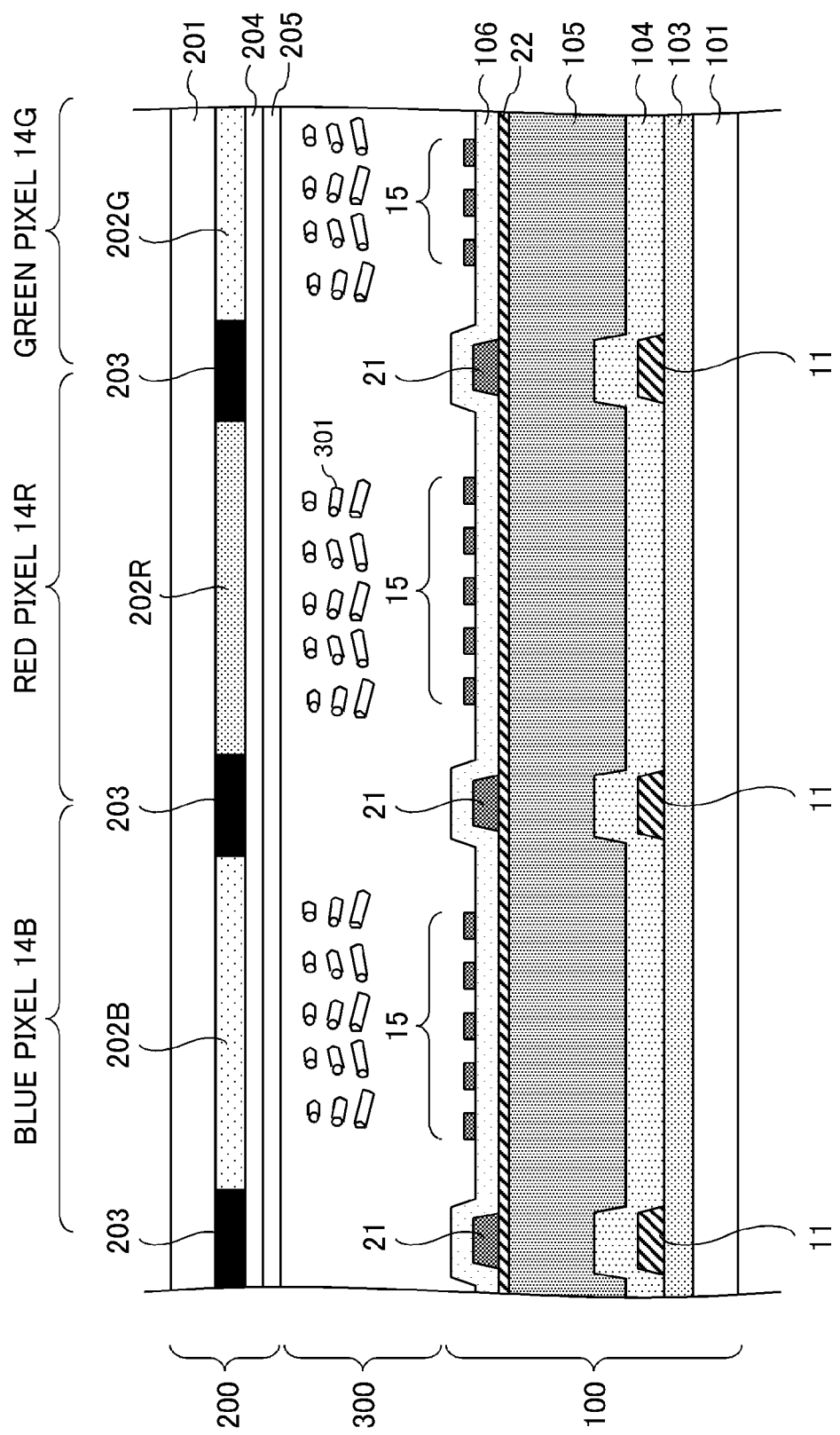
FIG. 4 is a sectional view taken along line B-B' in FIG. 2.

FIG. 2 is a plan view partially illustrating a configuration of display panel 10. FIG. 3 is a sectional view taken along line A-A' in FIG. 2, and FIG. 4 is a sectional view taken along line B-B' in FIG. 2. As illustrated in FIG. 3, display panel 10 includes thin film transistor substrate (hereinafter, referred to as a TFT substrate) 100 disposed on the rear surface side, color filter substrate (hereinafter, referred to as a CF substrate) 200 that is disposed on the front surface side (display surface side) to face TFT substrate 100, and liquid crystal layer 300 sandwiched between TFT substrate 100 and CF substrate 200. For convenience, FIG. 2 illustrates the state where TFT substrate 100 is seen from the front surface side through CF substrate 200.

As illustrated in FIGS. 1 and 2, a plurality of data lines 11 extending in a first direction (for example, a column direction) and a plurality of gate lines 12 extending in a second direction (for example, a row direction) different from the first direction are formed in TFT substrate 100, a thin film transistor (hereinafter, referred to as a TFT) 13 is formed in a neighborhood of each of intersections of the plurality of data lines 11 and the plurality of gate lines 12, a rectangular area surrounded by two adjacent data lines 11 and two adjacent gate lines 12 is defined as one pixel 14, and a plurality of pixels 14 are arranged in a matrix form (the row direction and the column direction). The plurality of data lines 11 are arranged at equal intervals in the row direction, and the plurality of gate lines 12 are arranged at equal intervals in the column direction. Pixel electrode 15 is provided in each pixel 14. As illustrated in FIG. 2, each pixel electrode 15 includes an opening (for example, a slit), and is formed into a stripe shape. One common electrode 22 (see FIGS. 3 and 4) shared by each pixel 14 is formed in TFT substrate 100, and a plurality of common electrode wirings 21 are formed on common electrode 22. The plurality of common electrode wirings 21 extend in the first direction (for example, the column direction), and are arranged at equal intervals in the second direction (for example, the row direction). In TFT 13, semiconductor layer 18 made of amorphous silicon (a-Si) is formed on gate insulator 103 (see FIGS. 3 and 4), and drain electrode 16 and source electrode 17 are formed on semiconductor layer 18. Drain electrode 16 is electrically connected to data line 11, and source electrode 17 and pixel electrode 15 are electrically connected to each other through contact hole 19.

A data signal (data voltage) is supplied from data line driving circuit 20 to each data line 11, and a gate signal (gate voltage) is supplied from gate line driving circuit 30 to each gate line 12. Common voltage Vcom is supplied to the common electrode 22 through the plurality of common electrode wirings 21 (see FIGS. 3 and 4). When an on voltage of the gate signal (gate-on voltage) is supplied to gate line 12, TFT 13 connected to gate line 12 is turned on to supply the data voltage to pixel electrode 15 through data line 11 connected to TFT 13. An electric field is generated by a difference between the data voltage supplied to pixel electrode 15 and common voltage Vcom supplied to common electrode 22. The liquid crystal is driven by the electric field to control transmittance of the light transmitted from the backlight, thereby displaying the image. The desired data voltages are supplied to data lines 11 connected to pixel electrodes 15 of pixels 14, which are formed by striped colored portions to correspond to red, green, and blue, thereby performing color display.

As illustrated in FIG. 4, a plurality of colored portions 202 are formed in CF substrate 200 according to each pixel 14. Each colored portion 202 is surrounded by black matrix 203 that blocks the light transmission, and formed into, for example, a rectangular shape. The plurality of colored portions 202 include red portion 202R that is made of a red (R color) material to transmit red light, green portion 202G that is made of a green (G color) material to transmit green light, and blue portion 202B that is made of a blue (B color) material to transmit blue light. Red portion 202R, green portion 202G, and blue portion 202B are repeatedly arrayed in this order in the row direction, colored portions 202 having the same color are arrayed in the column direction, and black matrix 203 is formed at a boundary between colored portions 202 adjacent to each other in the row direction and the column direction.

As illustrated in FIGS. 1 and 2, the plurality of pixels 14 include red pixel 14R corresponding to red portion 202R, green pixel 14G corresponding to green portion 202G, and blue pixel 14B corresponding to blue portion 202B. Pixels 14 are arrayed according to the arrangement of colored portions 202, red pixel 14R, green pixel 14G, and blue pixel 14B are repeatedly arrayed in this order in the row direction, and pixels 14 having the same color are arrayed in the column direction.

A sectional structure of pixel 14 will specifically be described below with reference to FIGS. 3 and 4. FIG. 3 illustrates a cross-section in which an area including TFT 13 in FIG. 2 is cut in the row direction, and FIG. 4 illustrates a cross-section in which an opening area of pixel 14 in FIG. 2 is cut in the row direction.

Referring to FIG. 3, in TFT substrate 100, gate line 12 is formed on glass substrate 101. Gate line 12 is formed by a metallic material mainly containing aluminum (Al), molybdenum (Mo), titanium (Ti), or copper (Cu), a plurality of laminated layers thereof, an alloy in which tungsten (W), manganese (Mn), or titanium (Ti) is added to the metallic material, or a laminated metallic layer of a combination thereof.

Gate insulator 103 is formed so as to cover gate line 12. Gate insulator 103 can be made of silicon nitride SiN. Semiconductor layer 18 is formed on gate insulator 103. Data line 11, and drain electrode 16 and source electrode 17 which constitute TFT 13 are formed on semiconductor layer 18. Drain electrode 16 is electrically connected to data line 11.

Interlayer insulator 104 is formed so as to cover data line 11, drain electrode 16, and source electrode 17. Interlayer insulator 104 can be made of silicon nitride SiN or silicon dioxide $SiO_2$.

Organic insulator 105 is formed on interlayer insulator 104. Organic insulator 105 can be made of a photosensitive organic material mainly containing acryl. For example, the organic material has a dielectric constant of 4 or less, which is lower than a dielectric constant of 6.7 of silicon nitride SiN. For the viewpoint of production, an organic material can be deposited thicker than silicon nitride SiN. For example, a thickness of organic insulator 105 is set in a range from 1.5 μm to 3 μm. In organic insulator 105, a thickness can be set larger while the dielectric constant is set lower. Therefore, a wiring capacitance formed between common electrode 22 disposed on organic insulator 105 and data line 11 or gate line 12 disposed below organic insulator 105 can be greatly reduced.

Common electrode 22 is formed on organic insulator 105. Common electrode 22 is made of a transparent electrode material ITO. For example, common electrode 22 can be made of indium tin oxide or indium zinc oxide. An area of each pixel 14 is covered with common electrode 22 except for an area where TFT 13 is formed. That is, common electrode 22 covers data line 11 to serve as a shield electrode. Therefore, for example, an electric field noise generated from data line 11 can be prevented from entering in liquid crystal layer 300. Common electrode wiring 21 through which common voltage Vcom is supplied to common electrode 22 is formed on common electrode 22.

Upper insulator 106 is formed so as to cover common electrode 22 and common electrode wiring 21. Upper insulator 106 can be made of silicon nitride SiN. Pixel electrode 15 is formed on upper insulator 106. Pixel electrode 15 is made of a transparent electrode material ITO. Pixel electrode 15 is electrically connected to source electrode 17 through contact hole 19 formed in interlayer insulator 104 and upper insulator 106. Although not illustrated, an alignment film is formed so as to cover pixel electrode 15, and a polarizing plate is formed outside glass substrate 101. In the configuration of FIGS. 3 and 4, common electrode 22 is disposed in a lower layer while pixel electrode 15 is disposed in an upper layer. Alternatively, pixel electrode 15 may be disposed in the lower layer while common electrode 22 is disposed in the upper layer. Organic insulator 105 may be omitted.

In CF substrate 200, colored portion 202 (see FIG. 4) and black matrix 203 are formed on glass substrate 201. For example, colored portion 202 is formed by a colored layer of red, green, and blue pigment-dispersion resists, and black matrix 203 is made of a resin material in which black pigment is used or a metallic material. Overcoat film 204 is formed so as to cover colored portion 202 and black matrix 203, and alignment film 205 is formed on overcoat film 204. Although not illustrated, the polarizing plate is formed outside glass substrate 201.

Liquid crystal layer 300 includes liquid crystal molecules 301 (positive type liquid crystal) having a positive dielectric anisotropy.

Although the IPS scheme is cited as an example of the lateral electric field scheme, the lateral electric field scheme is not limited to the IPS scheme. The layered structure of each portion constituting pixel 14 is not limited to the above configuration. For example, pixel electrode 15 and common electrode 22 may have a comb-teeth shape and may be disposed in the same layer.

Figure 5:
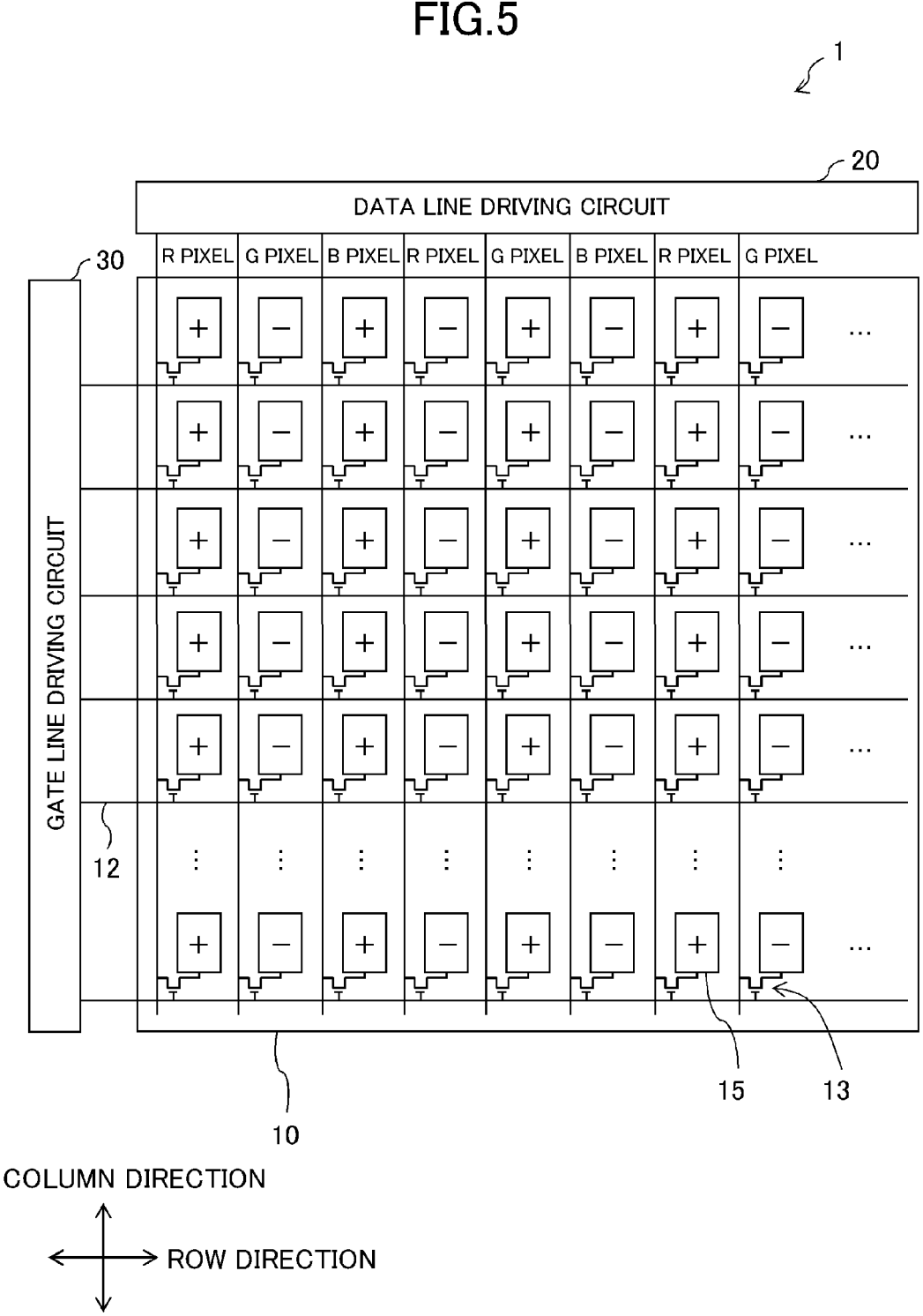
FIG. 5 is a view illustrating a polarity state of the data voltage applied to each pixel in liquid crystal display device according to an exemplary embodiment of the present disclosure.

FIG. 5 is a view illustrating a polarity state of the data voltage applied to each pixel 14 in liquid crystal display device 1. As illustrated in FIG. 5, the polarity of data voltage applied to each pixel 14 is inverted in each column. Although not illustrated, the polarity of each data voltage is inverted in each frame. That is, liquid crystal display device 1 performs column line inversion drive (also referred to as column inversion drive). In the column line inversion drive, the data signals supplied to the adjacent data lines 11 differ from each other in the voltage polarity while the common voltage Vcom is fixed, and the voltage polarity is inverted in each frame.

The variation in display luminance due to the influence of the difference in amplitude between the data voltages applied to the pixels adjacent to each other will be described below by a specific example.

Figure 6:
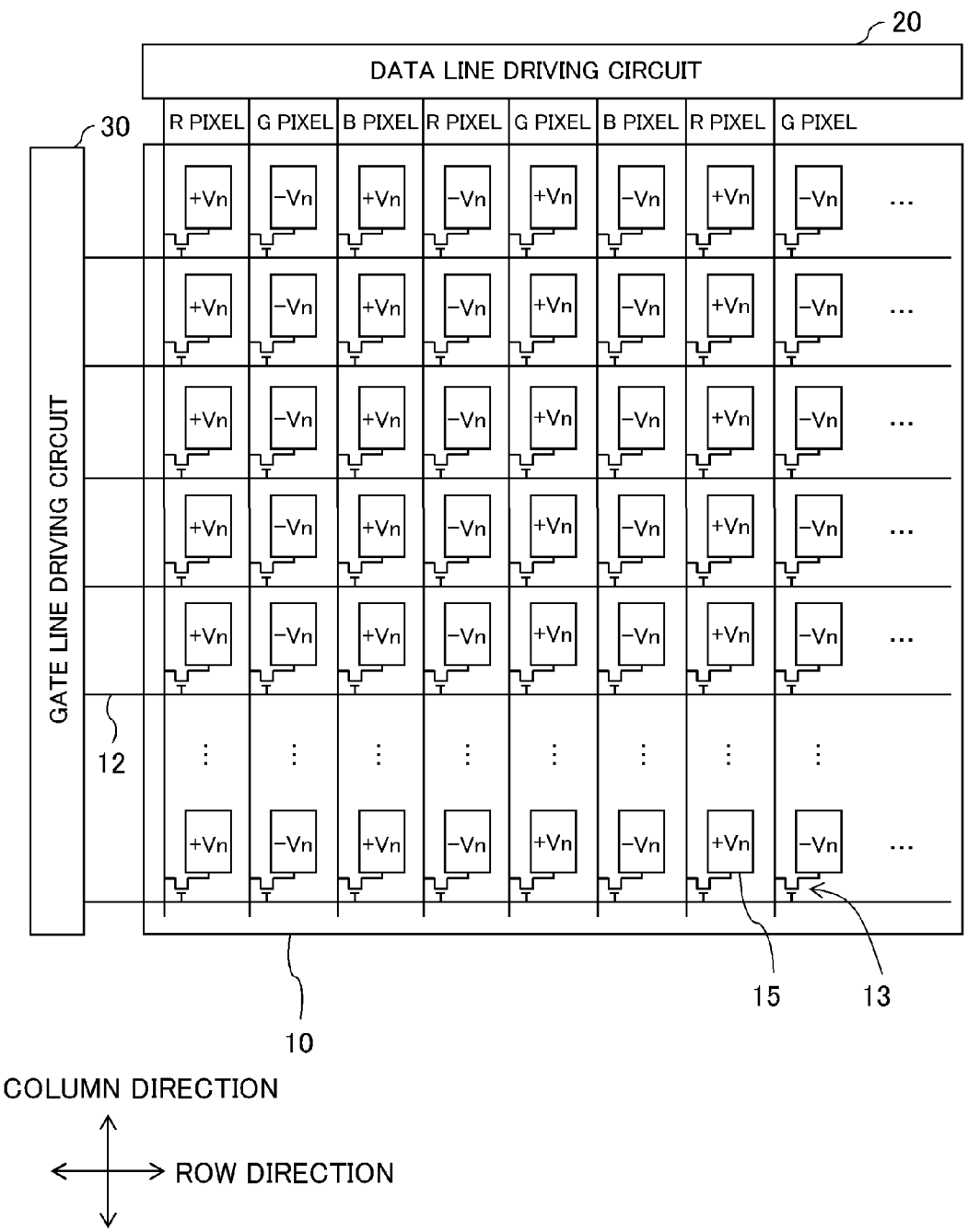
FIG. 6 is a view illustrating a polarity state of the data voltage applied to each pixel when a white image is displayed in a whole display screen.

For example, in the column line inversion drive, it is assumed that W0 is display luminance when data voltage Vn applied to each of a red pixel (R pixel), a green pixel (G pixel), and a blue pixel (B pixel) is set to a maximum value (for example, ±5V) to display a white image in a whole display screen (see FIG. 6). It is assumed that Wr is display luminance when data voltage Vn applied to the red pixel is set to the maximum value (for example, ±5V), when data voltages Vn applied to the green and blue pixels are set to 0V, and when a red image is displayed in the whole display screen (see FIG. 7). It is assumed that Wg is display luminance when data voltage Vn applied to the green pixel is set to the maximum value (for example, ±5V), when data voltages Vn applied to the red and blue pixels are set to 0V, and when a green image is displayed in the whole display screen (see FIG. 8). It is assumed that Wb is display luminance when data voltage Vn applied to the blue pixel is set to the maximum value (for example, ±5V), when data voltages Vn applied to the red and green pixels are set to 0V, and when a blue image is displayed in the whole display screen (see FIG. 9).

Figure 10A:
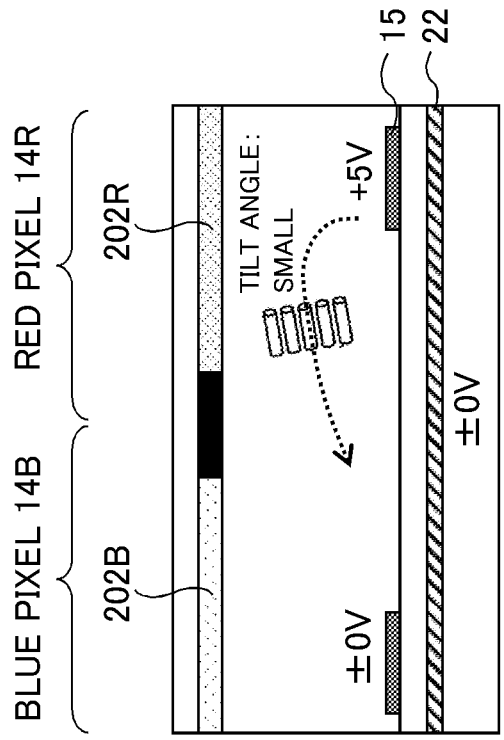
FIGS. 10A and 10B are views illustrating variations in display luminance.
Figure 10B:
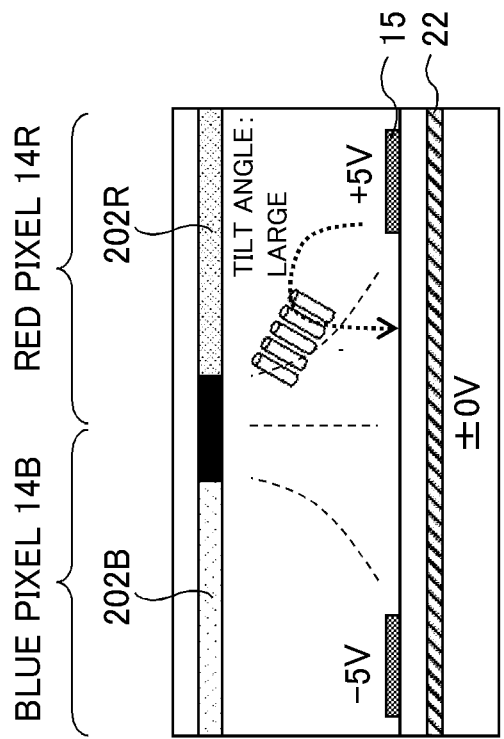

Ideally, display luminance (white luminance) W0 of the white image is equal to a total (total luminance of single colors Wrgb) of display luminance (red luminance) Wr of the red image, display luminance (green luminance) Wg of the green image, and display luminance (blue luminance) Wb of the blue image (W0=Wr+Wg+Wb). However, when the positive type liquid crystal is used in the lateral electric field scheme liquid crystal display device, in the case where the white image is displayed (see FIG. 10A), as compared with the case where a monochrome image is displayed (see FIG. 10B), the difference in amplitude between the data voltages (voltage difference) applied to the pixels adjacent to each other increases, and the tilt angle of the liquid crystal also increases at the boundary between the pixels due to the electric field corresponding to the difference in amplitude. Therefore, in the case where the white image is displayed, the transmittance of each pixel is lowered, and the display luminance is lowered. That is, white luminance W0 is lower than total luminance of single colors Wrgb (W0<Wr+Wg+Wb).

Figure 11:
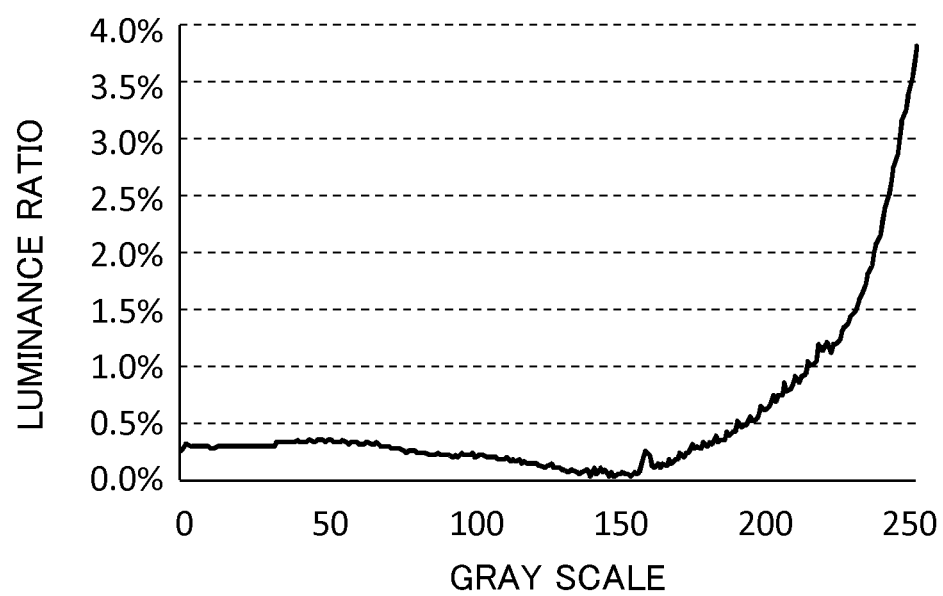
FIG. 11 is a graph illustrating a relationship between an input gray scale and a ratio of a difference between total luminance of single colors and white luminance to white luminance.

FIG. 11 is a graph illustrating a relationship between an input gray scale and a ratio ((Wrgb−W0)/W0) of a difference between total luminance of single colors Wrgb and white luminance W0 to white luminance W0. FIG. 11 illustrates the luminance in the case where the display is performed according to the input gray scale without correcting the input gray scale. As can be seen from FIG. 11, for example, when the input gray scale is greater than or equal to a 150-level gray scale, the luminance ratio increases with increasing input gray scale. That is, with increasing input gray scale, the difference between white luminance W0 and total luminance of single colors Wrgb increases, and the variation in display luminance increases. Such a variation in display luminance may cause degradation of the display quality.

On the other hand, liquid crystal display device 1 according to the exemplary embodiment has a configuration that reduces the variation in display luminance. A specific configuration of liquid crystal display device 1 will be described with reference to FIGS. 12 and 13.

Figure 12:
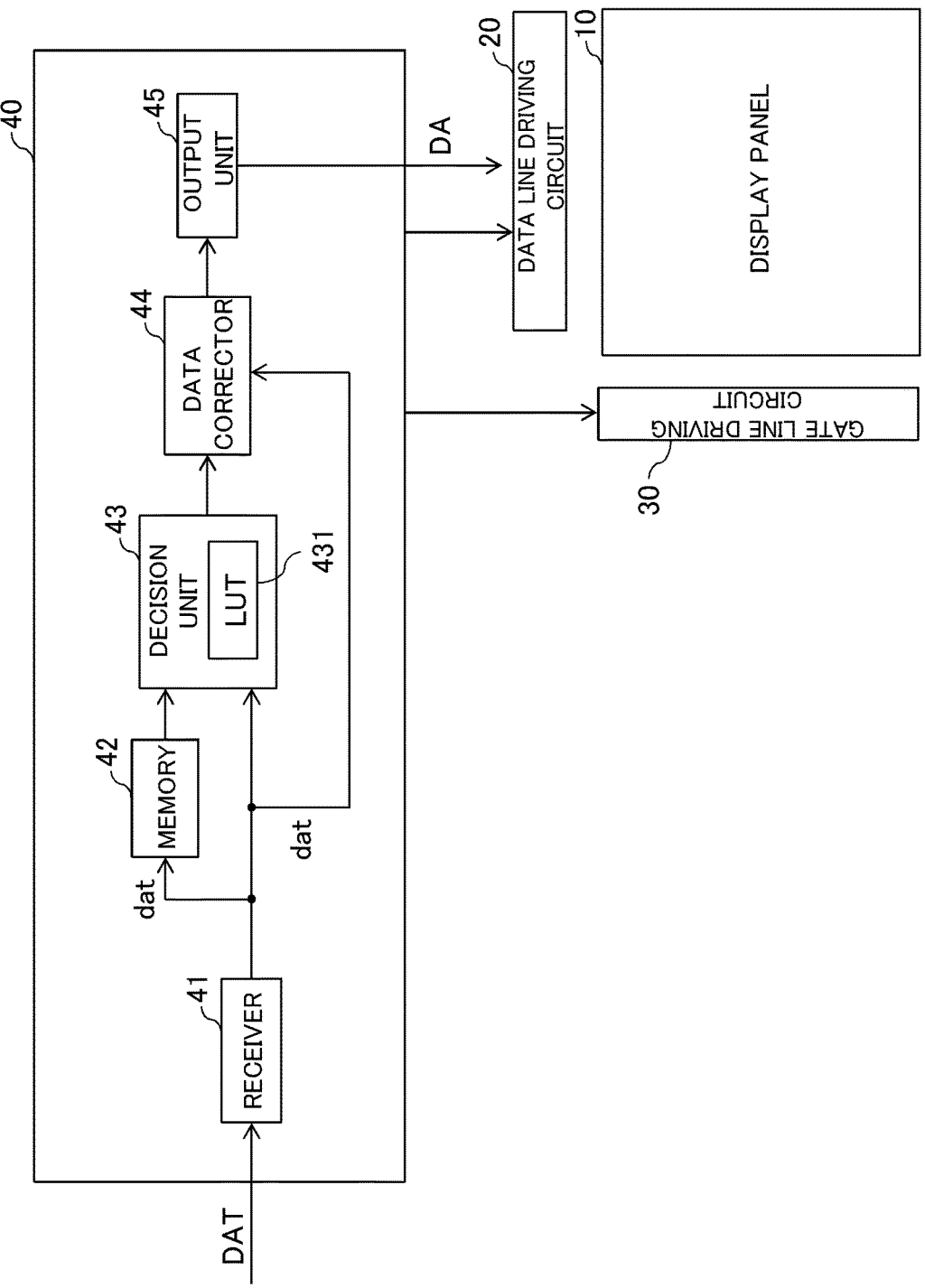
FIG. 12 is a block diagram illustrating a specific configuration of timing controller according to an exemplary embodiment of the present disclosure.

FIG. 12 is a block diagram illustrating a specific configuration of timing controller 40. Timing controller 40 includes receiver 41, memory 42, decision unit 43, data corrector 44, and output unit 45. Receiver 41 receives video signal DAT from an external system (not illustrated). Receiver 41 sequentially receives temporally previous and subsequent pieces of data (pixel data dat) in units of pixels, which are included in video signal DAT. Received pixel data dat is stored in memory 42. Decision unit 43 decides a correction value for received pixel data dat. Data corrector 44 corrects pixel data dat based on the decided correction value. Output unit 45 outputs pixel data dat to data line driving circuit 20. Timing controller 40 performs other pieces of known image processing. For example, based on a video signal and a control signal (a clock signal, a vertical synchronizing signal, and a horizontal synchronizing signal), which are supplied from an external system, timing controller 40 generates polarity signal POL deciding the polarity of the data voltage supplied to data line 11 and various timing signals (data start pulse DSP, data clock DCK, gate start pulse GSP, and gate clock GCK) controlling the drive of data line driving circuit 20 and gate line driving circuit 30 (see FIG. 1).

Herein, two pixels 14 adjacent to each other in the row direction is cited as an example. The two pieces of pixel data dat applied to pixels 14 are temporally sequentially disposed in video signal DAT. In the two pieces of pixel data dat, previously-received pixel data dat is referred to as preceding pixel data dat1, and pixel data dat received subsequent to preceding pixel data dat1 is referred to as current pixel data dat2.

When receiver 41 receives preceding pixel data dat1, preceding pixel data dat1 is stored in memory 42, and preceding pixel data dat1 corresponding to the input gray scale is output from output unit 45 to data line driving circuit 20 without correcting the input gray scale of preceding pixel data dat1.

Then, when receiver 41 receives current pixel data dat2, decision unit 43 obtains preceding pixel data dat1 from memory 42, and obtains current pixel data dat2 from receiver 41. Decision unit 43 compares preceding pixel data dat1 with current pixel data dat2, and decides the correction value of current pixel data dat2 by referring to look-up table (LUT) 431. Decision unit 43 also serves as a comparator. FIG. 13 is a view illustrating an example of LUT 431. In LUT 431, a gray scale (input gray scale) of preceding pixel data dat1 in video signal DAT, a gray scale (input gray scale) of current pixel data dat2 in video signal DAT, and correction gray scale Dn of current pixel data dat2 are associated with one another. Correction gray scale Dn of current pixel data dat2 is set lower than the input gray scale of current pixel data dat2. For example, in LUT 431, correction gray scale Dn is set in a range where the input gray scale of current pixel data dat2 is greater than or equal to the 150-level gray scale and a difference between the input gray scale of current pixel data dat2 and the input gray scale of preceding pixel data dat1 is greater than or equal to the 150-level gray scale. Correction gray scale Dn is set such that a correction amount increases with increasing difference between the input gray scale of current pixel data dat2 and the input gray scale of preceding pixel data dat1. For example, correction gray scale Da1 (<160-level gray scale) is set when the input gray scale of current pixel data dat2 is a 160-level gray scale and the input gray scale of preceding pixel data dat1 is a 0-level gray scale. For example, correction gray scales Db1 (<192-level gray scale), Db2 (<Db1) are set when the input gray scale of current pixel data dat2 is a 192-level gray scale and the input gray scale of preceding pixel data dat1 is a 32-level gray scale and the 0-level gray scale. For example, correction gray scales Dc1 (<224-level gray scale), Dc2 (<Dc1), Dc3 (<Dc2) are set when the input gray scale of current pixel data dat2 is a 224-level gray scale and the input gray scale of preceding pixel data dat1 is a 64-level gray scale, the 32-level gray scale, and the 0-level gray scale. For example, correction gray scales Dd1 (<255-level gray scale), Dd2 (<Dd1), Dd3 (<Dd2), Dd4 (<Dd3) are set when the input gray scale of current pixel data dat2 is a 255-level gray scale and the input gray scale of preceding pixel data dat1 is a 128-level gray scale, the 64-level gray scale, the 32-level gray scale, and the 0-level gray scale.

When decision unit 43 decides the correction value (correction gray scale) of current pixel data dat2, data corrector 44 corrects current pixel data dat2 based on the correction value. Specifically, data corrector 44 corrects the input gray scale of current pixel data dat2 to the correction gray scale. For example, in the case of the monochrome display (for example, see FIGS. 7 and 10B), namely, in the case where the input gray scale of preceding pixel data dat1 is the 0-level gray scale and the input gray scale of preceding pixel data dat2 is the 255-level gray scale, data corrector 44 corrects current pixel data dat2 to correction gray scale Dd4 (<255) lower than the 255-level gray scale.

Output unit 45 outputs data voltage DA to data line driving circuit 20 according to the correction gray scale of current pixel data dat2.

Figure 7:
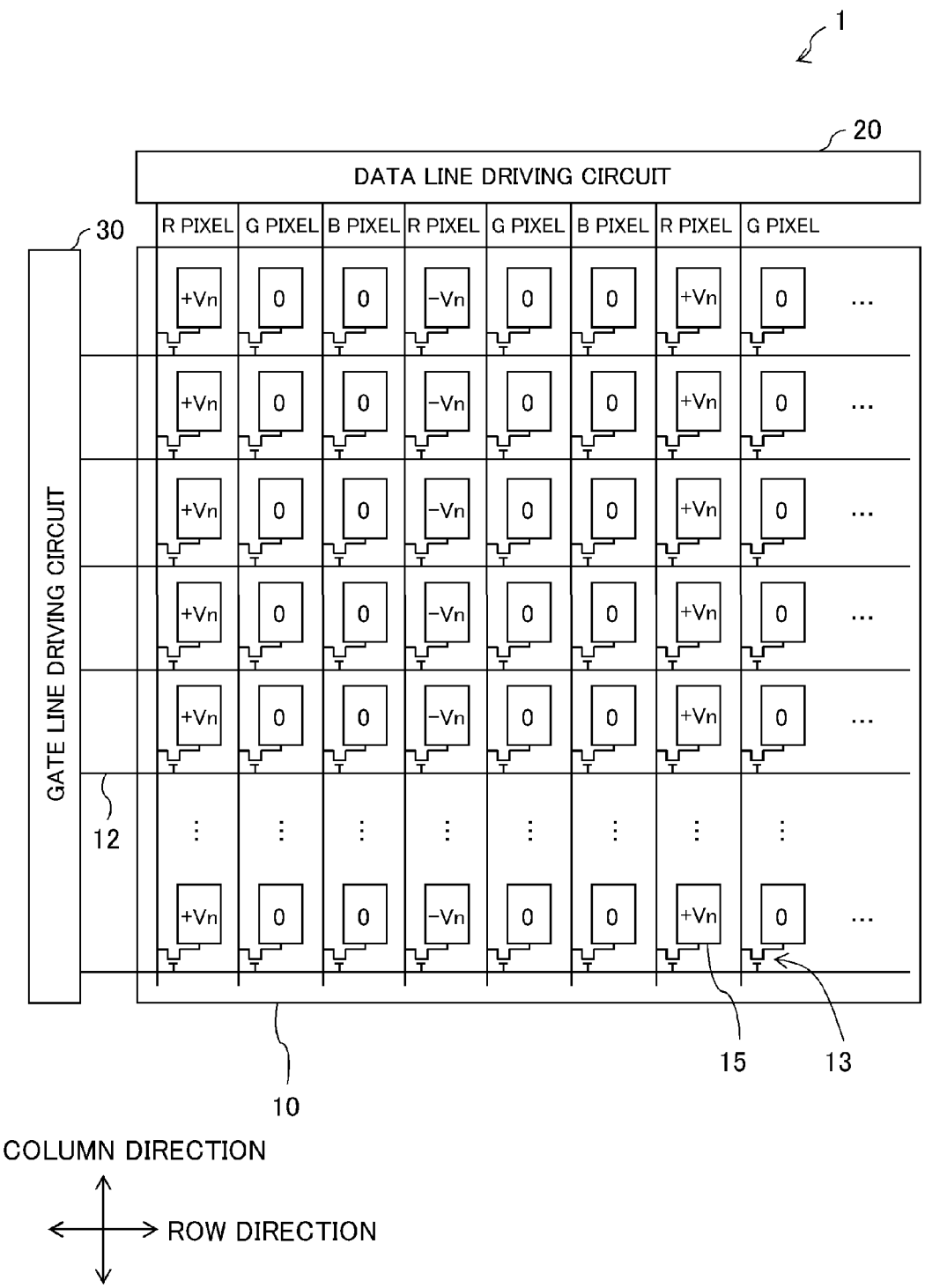
FIG. 7 is a view illustrating a polarity state of the data voltage applied to each pixel when a red image is displayed in a whole display screen.
Figure 8:
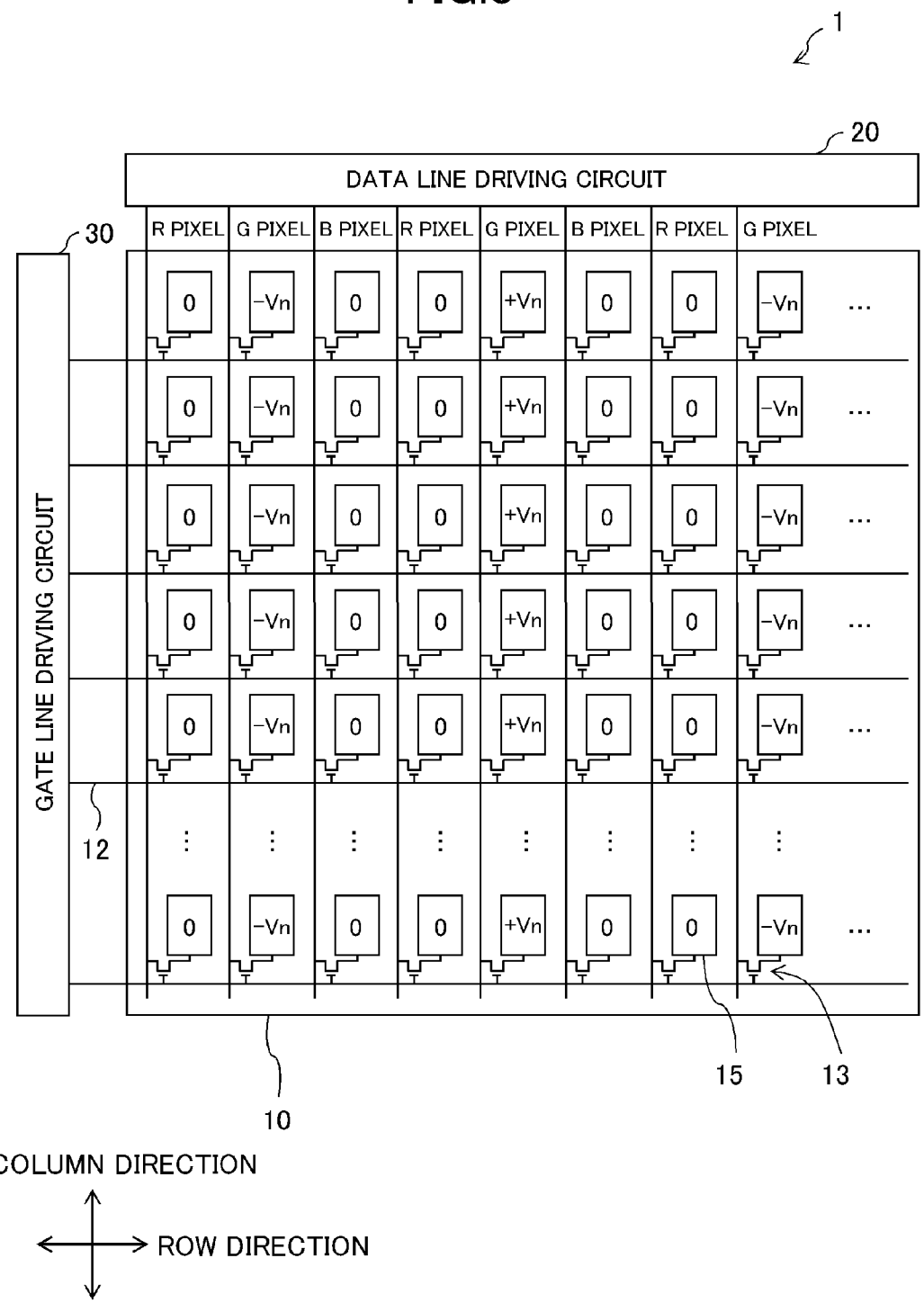
FIG. 8 is a view illustrating a polarity state of the data voltage applied to each pixel when a green image is displayed in a whole display screen.
Figure 9:
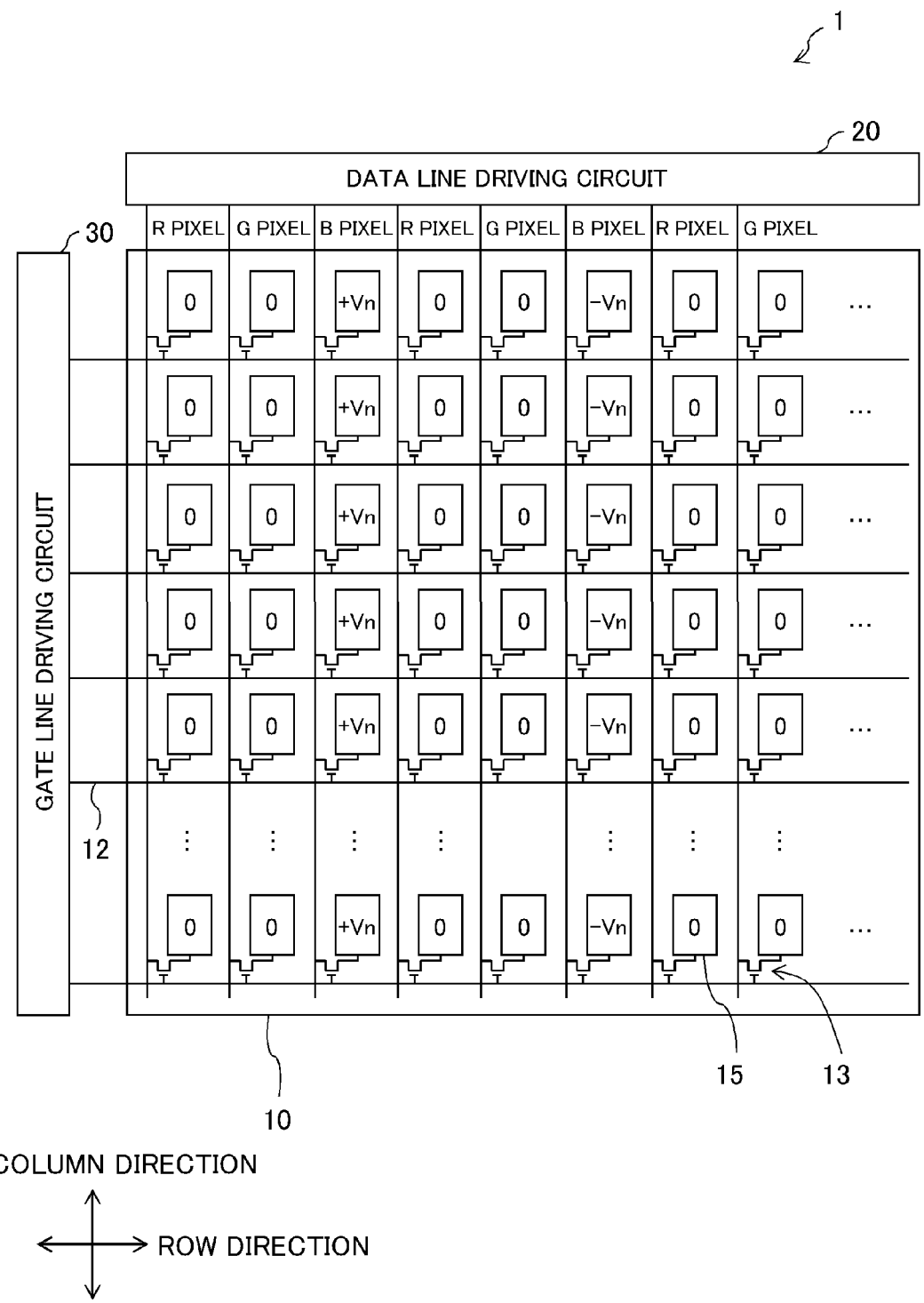
FIG. 9 is a view illustrating a polarity state of the data voltage applied to each pixel when a blue image is displayed in a whole display screen.

With the above configuration, for example, in the case where the monochrome display is performed as illustrated in FIGS. 7 to 9, namely, in the case where one of the two pixels adjacent to each other is a lower gray scale while the other pixel is a higher gray scale, and the difference in gray scale between the pixels, the display luminance can be lowered by correcting the higher gray scale to a lower level. Therefore, display luminance (red luminance) Wr of the red image, display luminance (green luminance) Wg of the green image, and display luminance (blue luminance) Wb of the blue image can be lowered, and the total luminance (total luminance of single colors Wrgb) of display luminance (red luminance) Wr, display luminance (green luminance) Wg, and display luminance (blue luminance) Wb can be brought close to display luminance (white luminance) W0 of the white image (W0≈Wr+Wg+Wb). Therefore, because the variation in display luminance can be reduced, the display quality degradation can be suppressed.

Timing controller 40 is not limited to the configuration in FIG. 12. For example, not only data corrector 44 may correct current pixel data dat2 by comparing current pixel data dat2 with not only preceding pixel data dat1, but also with next pixel data dat1. That is, the correction may be performed by comparing the input gray scale of the target pixel with the pieces of pixel data input to the two pixels horizontally or vertically adjacent to the target pixel. Alternatively, decision unit 43 may calculate the correction value through arithmetic processing. In this case, LUT 431 can be omitted. For example, timing controller 40 may include a delay circuit while memory 42 is omitted. In this case, the delay circuit may adjust transfer timing of preceding pixel data dat1 and current pixel data dat2, and decision unit 43 and data corrector 44 in a subsequent stage may perform the pieces of processing. The data correction processing of timing controller 40 may be performed in data line driving circuit 20.

As described above, in liquid crystal display device 1 according to the exemplary embodiment, in the case where signals having the maximum level gray scale are input to red pixel 14R, green pixel 14G, and blue pixel 14B to display the white image in the display pixel 14 including one red pixel 14R, one green pixel 14G, and one blue pixel 14B, a first data voltage having a first voltage level is supplied to each of data lines 11 connected to red pixel 14R, green pixel 14G, and blue pixel 14B. On the other hand, in the case where the signal having the maximum level gray scale is input to red pixel 14R and the signal having the minimum level gray scale is input to each of green pixel 14G and blue pixel 14B in the display pixel 14 to display the red monochrome image, the data voltage having the voltage level lower than the first voltage level is supplied to data line 11 connected to red pixel 14R. Similarly, in the case where the signal having the maximum level gray scale is input to green pixel 14G and the signal having the minimum level gray scale is input to each of red pixel 14R and blue pixel 14B in the display pixel 14 to display the green monochrome image, the data voltage having the voltage level lower than the first voltage level is supplied to data line 11 connected to green pixel 14G. Similarly, in the case where the signal having the maximum level gray scale is input to blue pixel 14B and the signal having the minimum level gray scale is input to each of red pixel 14R and green pixel 14G in the display pixel 14 to display the green monochrome image, the data voltage having the voltage level lower than the first voltage level is supplied to data line 11 connected to blue pixel 14B.

What is claimed is:

1. A liquid crystal display device comprising:
   a first substrate including a pixel electrode and a common electrode;
   a second substrate disposed opposite to the first substrate; and
   a liquid crystal layer that is disposed between the first substrate and the second substrate, the liquid crystal layer including a liquid crystal molecule having a positive dielectric anisotropy,
   wherein in a first pixel and a second pixel, which are adjacent to each other,
   when a first data voltage applied to the first pixel in an input video signal is higher than a second data voltage applied to the second pixel in the input video signal, a first correction data voltage in which the first data voltage is corrected lower is applied to the first pixel,
   the liquid crystal display device further comprising:
   a comparator that compares a first input gray scale corresponding to the first pixel in the input video signal with a second input gray scale corresponding to the second pixel in the input video signal;
   a corrector that corrects the first input gray scale to a first correction gray scale lower than the first input gray scale when the first input gray scale is higher than the second input gray scale and a difference between the first input gray scale and the second input gray scale is higher than a predetermined gray scale;
   a look-up table in which the first input gray scale, the second input gray scale, and the first correction gray scale are associated with one another; and
   a decision unit that refers to the look-up table to decide the first correction gray scale,
   wherein the corrector corrects the first input gray scale to the first correction gray scale decided by using the decision unit.

2. The liquid crystal display device according to claim 1, wherein when a difference between the first data voltage and the second data voltage is higher than a predetermined value, the first data voltage is corrected to the first correction data voltage.

3. The liquid crystal display device according to claim 1, wherein when the first data voltage is higher than the second data voltage and a polarity of the first data voltage is different from a polarity of the second data voltage, the first data voltage is corrected to the first correction data voltage.

4. The liquid crystal display device according to claim 1, wherein when a first input gray scale corresponding to the first pixel in the input video signal is higher than a second input gray scale corresponding to the second pixel in the input video signal and a difference between the first input gray scale and the second input gray scale is higher than a predetermined gray scale, a data voltage corresponding to a first correction gray scale in which the first input gray scale is corrected lower is applied to the first pixel.

* * * * *